US008444023B2

(12) United States Patent
Rossignol

(10) Patent No.: US 8,444,023 B2

(45) Date of Patent: May 21, 2013

(54) PUSH-BUTTON FOR A SYSTEM FOR DISPENSING A PRODUCT UNDER PRESSURE

(75) Inventor: Eric Rossignol, Chalon sur Saone (FR)

(73) Assignee: Rexam Dispensing SMT S.A. (FR)

( * ) Notice: Subject to any disclaimer, the term of this patent is extended or adjusted under 35 U.S.C. 154(b) by 202 days.

(21) Appl. No.: 12/840,752

(22) Filed: Jul. 21, 2010

(65) Prior Publication Data

US 2011/0017779 A1 Jan. 27, 2011

(30) Foreign Application Priority Data

Jul. 22, 2009 (FR) ...................................... 09 03630

(51) Int. Cl.
*G01F 11/00* (2006.01)

(52) U.S. Cl.
USPC ........................................ 222/321.7; 222/380

(58) Field of Classification Search
USPC ................... 222/321.7, 256, 380, 321.3, 239, 222/321.9, 207, 383, 384, 385, 340, 209, 222/405, 386, 391, 259, 260, 402.14, 383.3, 222/492, 336, 341, 632
See application file for complete search history.

(56) References Cited

U.S. PATENT DOCUMENTS 4,732,549 A * 3/1988 von Schuckmann ......... 417/472
5,152,434 A * 10/1992 Birmelin ....................... 222/207
5,561,901 A * 10/1996 Stahley et al. ............. 29/888.02
6,279,784 B1 * 8/2001 O'Neill ......................... 222/207
6,505,622 B2 * 1/2003 Py ............................ 128/203.18
6,712,243 B2 * 3/2004 Rossignol ..................... 222/207
6,966,465 B2 * 11/2005 Kang ......................... 222/321.9
6,991,137 B2 * 1/2006 Schultz ......................... 222/377
7,048,155 B2 * 5/2006 Kuwahara et al. ......... 222/321.9
8,118,195 B2 * 2/2012 Decottignies ................. 222/207
2005/0167450 A1 8/2005 Lanzendorfer et al.
2009/0065531 A1 * 3/2009 Decottignies ................. 222/207
2009/0272765 A1 * 11/2009 Seki et al. .................. 222/321.3
2009/0283548 A1 * 11/2009 Hummel .................... 222/321.7
2010/0224652 A1 * 9/2010 Lim ............................. 222/256

FOREIGN PATENT DOCUMENTS

EP 1449593 A1 8/2004
WO 02056725 A1 7/2002

OTHER PUBLICATIONS

French Search Report and Written Opinion; Application No. FR 0903630; Jan. 13, 2010; 6 pages.

* cited by examiner

*Primary Examiner* — Paul R Durand
*Assistant Examiner* — Bob Zadeh
(74) *Attorney, Agent, or Firm* — St. Onge Steward Johnston & Reens LLC

(57) ABSTRACT

A push-button for a system for dispensing a product under pressure, the push-button includes an actuator body having an orifice for ejecting the product, a closing off valving element of the ejection orifice and a sleeve having a mounting well of the push-button on a feed tube for the product under pressure, the body being slidably mounted around the sleeve between a high position and a low position by forming between them a space for carrying the product from the mounting well to the orifice for ejecting the product, the valving element being mounted between the body and the sleeve by the intermediary of a device for reversible displacing of the valving element between a closing off position—respectively an ejection position—when the body is in high position—respectively in low position—, the push-button includes an elastic recalling of the body in high position.

13 Claims, 7 Drawing Sheets

PUSH-BUTTON FOR A SYSTEM FOR DISPENSING A PRODUCT UNDER PRESSURE

CROSS-REFERENCE TO RELATED APPLICATIONS

The present application claims priority from French patent application FR-09 03630 filed on Jul. 22, 2009, the content of which is incorporated herein by reference.

FIELD OF THE INVENTION

This invention relates to a push-button for a system for dispensing a product under pressure, a dispensing system comprising a pump actuated by such a push-button as well as a bottle containing a product to be dispensed under pressure by means of such a dispensing system.

BACKGROUND OF THE INVENTION

In a particular application, the product is of the gel or cream type, for example for a use in cosmetics or for pharmaceutical treatments.

Systems for dispensing are known comprising a pump provided with a feed tube for the product under pressure whereon a push-button is fixed to actuate the displacement of said tube on a dispensing/suction stroke of the product.

In particular, the push-button can include an actuator body having an orifice for ejecting the product and a sleeve having a mounting well of said push-button on the feed tube of the pump. As such, by pressing on the body of the push-button, the pump is actuated to dispense the product in the form of a small amount or a continuous stream.

The systems for dispensing can be provided with a means for reversible closing of the orifice for ejecting the product between two dispensings, in order to limit the contacts between the outside air and the product remaining in the pump, in particular in order to avoid a drying and/or a degradation of said product over time.

To do this, the use of an elastically deformable sleeve is known whereon is formed a lip which can be displaced by application of the dispensing pressure on it. The reversible closing can then be obtained by arranging the sleeve on the body, with said lip in sealed contact in the orifice for ejecting the product, the displacement of said lip opening said orifice.

However, the sleeves which are components moulded separately then added on the body, have the disadvantage of a low mechanical resistance, i.e. they are sometimes carried away by the product stream. In addition, during industrial production at high rates, they are difficult to position on the body, as they are constituted of a flexible material and therefore often adherent to the walls of the feed chutes and the members for grasping of the assembly machines.

According to another known embodiment, the reversible closing can be obtained by means of a closing off valving element of the ejection orifice, said valving element able to be displaced between its closing off and ejection positions on the actuating stroke of the push-button, in particular at the beginning of this stroke.

However, the carrying out of the closing off valving elements is often complex, the components are difficult to produce and their assembly is not easy, which increases the costs of industrial production.

The invention aims to simplify the carrying out of dispensing systems provided with a closing off valving element of the ejection orifice by proposing a design comprised of parts that are simple to carry out and in a limited number.

Furthermore, the invention proposes a seal of the closing which is improved in such a way as to be able to dispense products of which the sensitivity to air is substantial. Consequently, the combined use of a dispensing system according to the invention with a bottle containing an air-sensitive product is particularly advantageous.

In particular, by sensitivity to air, products are provided containing a solvent that is able to evaporate rapidly, for example with an alcohol or water base, or containing photosensitive substances, for example solar filters, or easily oxidizable, for example vitamins in particular vitamin C.

Moreover, the operation of the dispensing system according to the invention limits the pressurisation of the product during the dispensing. As such, the combined use of a dispensing system according to the invention with a bottle containing a product sensitive to mechanical stresses is also particularly advantageous.

In particular, by sensitivity to mechanical stresses, products are provided, for example creams, able to undergo a physical-chemical transformation under pressure, in particular a separation or a phase change.

The operation of the dispensing system according to the invention also makes possible the dispensing of particularly viscous products.

SUMMARY OF THE INVENTION

In order to achieve these various improvements, according to a first aspect, the invention proposes a push-button for a system for dispensing a product under pressure, said push-button comprising an actuator body having an orifice for ejecting the product, a closing off valving element of the ejection orifice and a sleeve having a mounting well of said push-button on a feed tube for the product under pressure, said body being slidably mounted around said sleeve between a high position and a low position by forming between them a space for carrying the product from said mounting well to said orifice for ejecting the product, said valving element being mounted between the body and the sleeve by the intermediary of a device for reversible displacing of said valving element between a closing off position—respectively an ejection position—when the body is in high position—respectively in low position—, said push-button further comprising at least one means of elastic recalling of the body in high position.

According to a second aspect, the invention proposes a dispensing system of a product under pressure comprising a pump actuated by such a push-button, said pump comprising a feed tube for the product under pressure whereon the mounting well of said push-button is fixed.

According to a third aspect, the invention proposes a bottle containing a product to be dispensed under pressure, said bottle comprising a ring whereon the hoop of such a dispensing system is associated in such a way as to place the pump in communication with the product in order to allow for the carriage of the product from the feed tube to the orifice for ejecting the product.

BRIEF DESCRIPTION OF THE DRAWINGS

Other objectives and advantages of the invention shall appear in the following description, provided in reference to the annexed figures, wherein.

DETAILED DESCRIPTION OF THE INVENTION

Figure 1A:
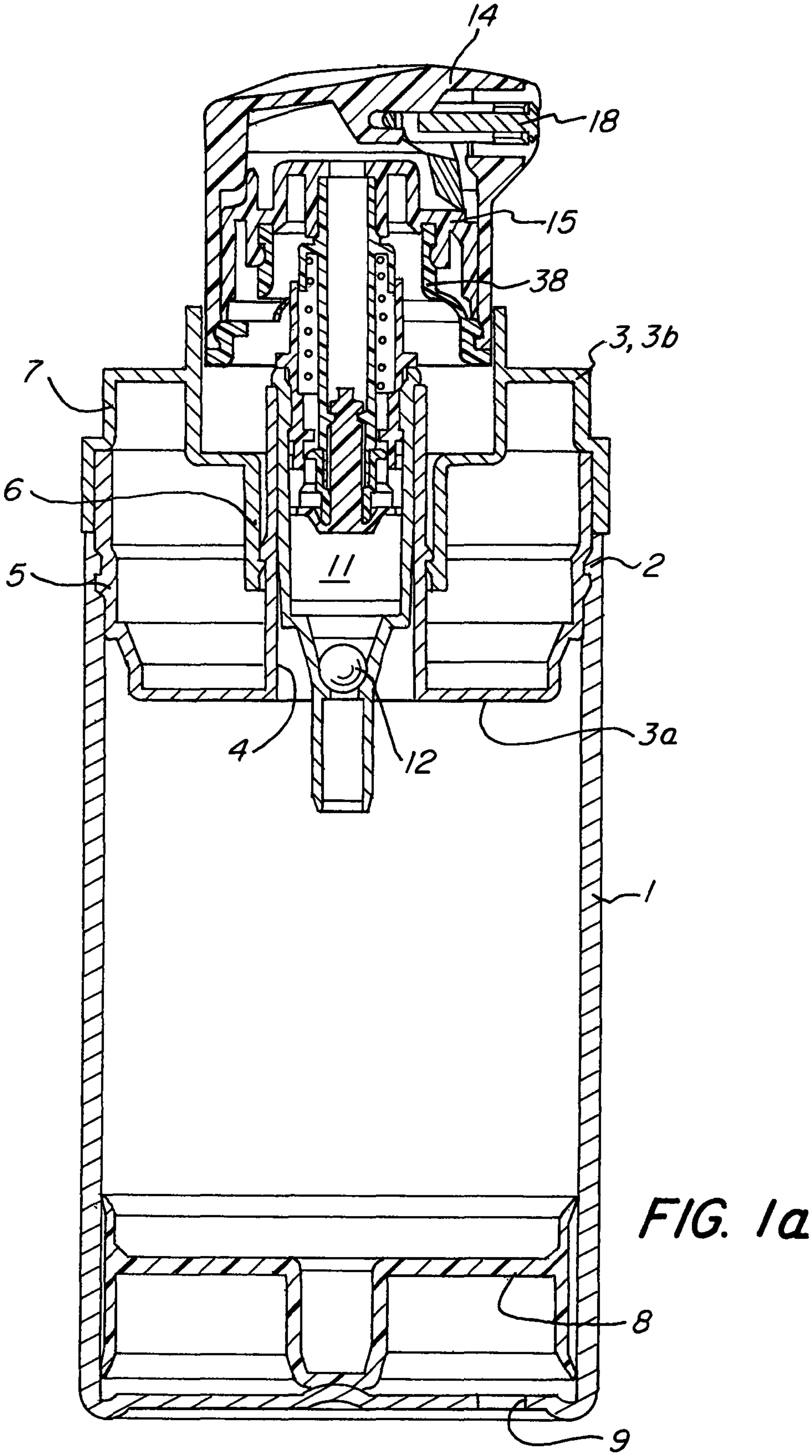
FIG. 1 are longitudinal section views of a bottle provided with a dispensing system according to an embodiment of the invention, wherein the closing off valving element is respectively in closing off position (FIG. 1*a*) and in ejection position (FIG. 1*b*)
Figure 1B:
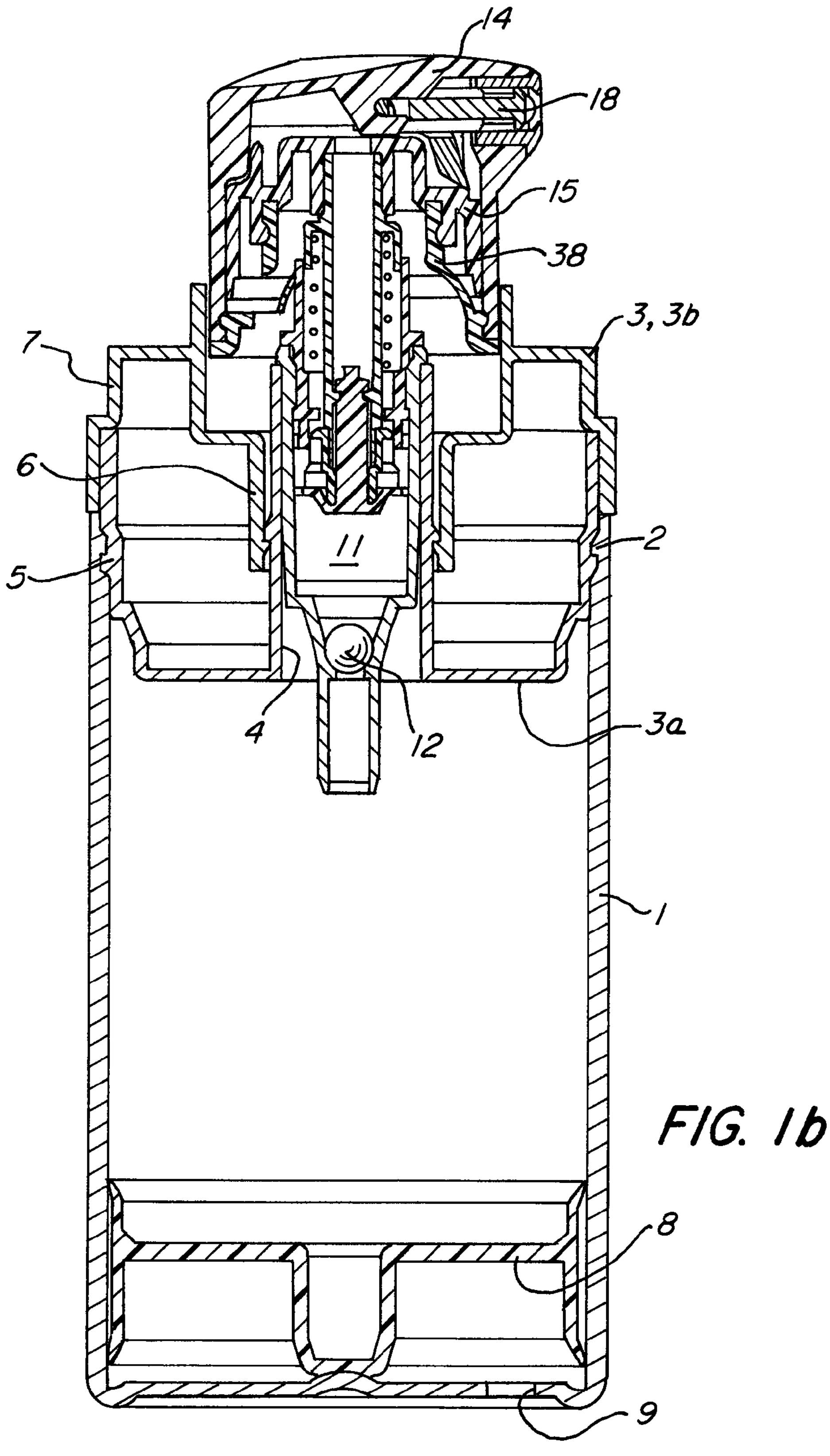
Figure 2:
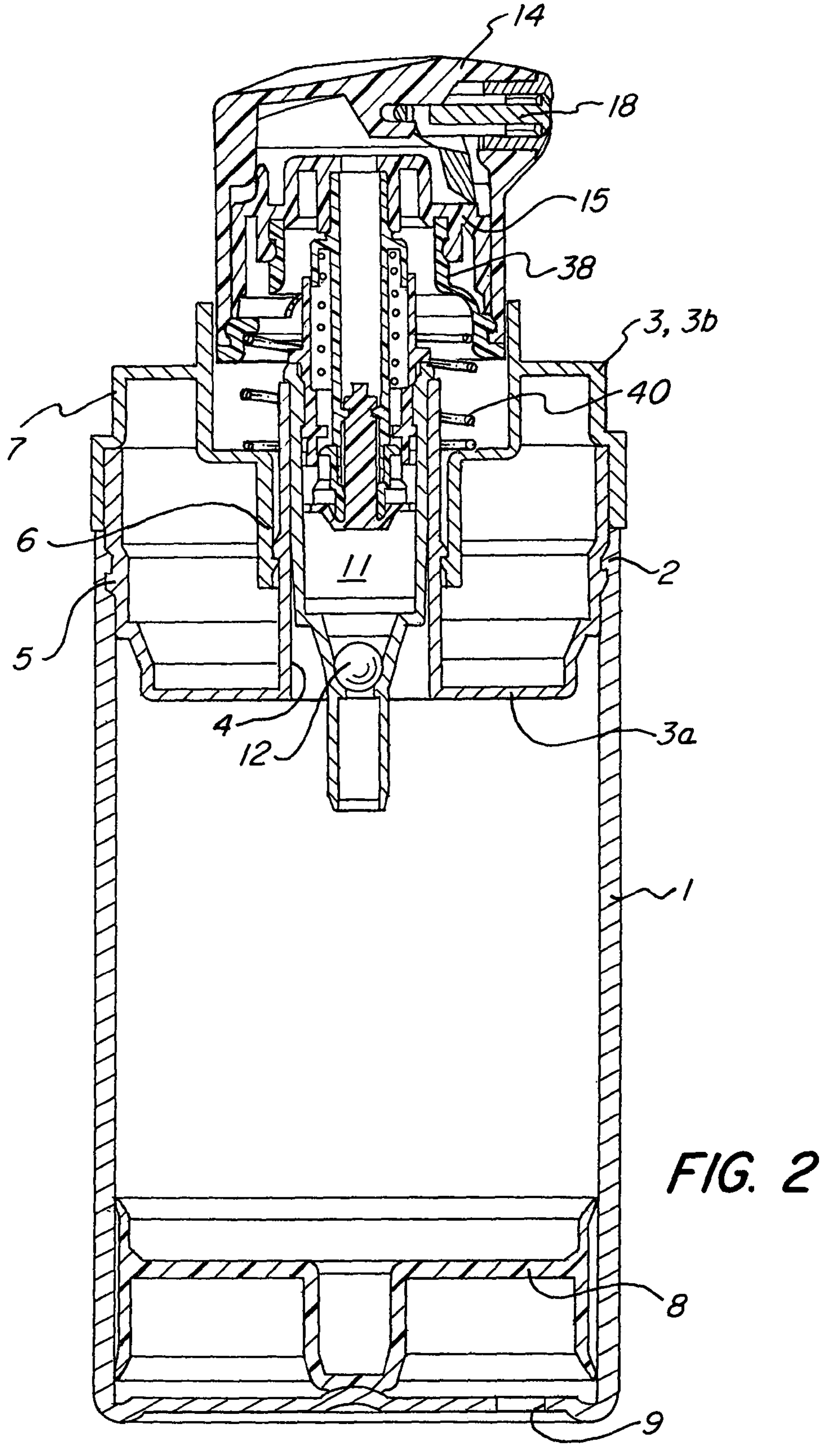
FIG. 2 is a view analogous to FIG. 1*a* for an alternative embodiment of the dispensing system.
Figure 3A:
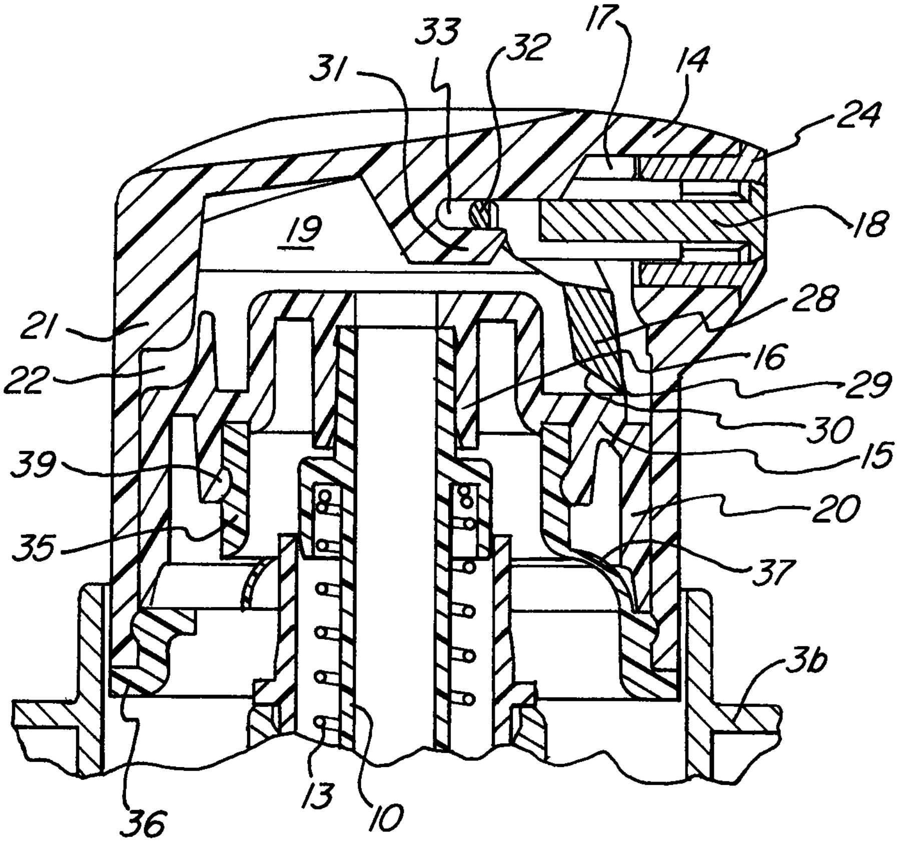
FIGS. 3*a* and 3*b* are enlarged views respectively of FIGS. 1*a* and 1*b* showing more precisely the embodiment of the push-button.
Figure 3B:
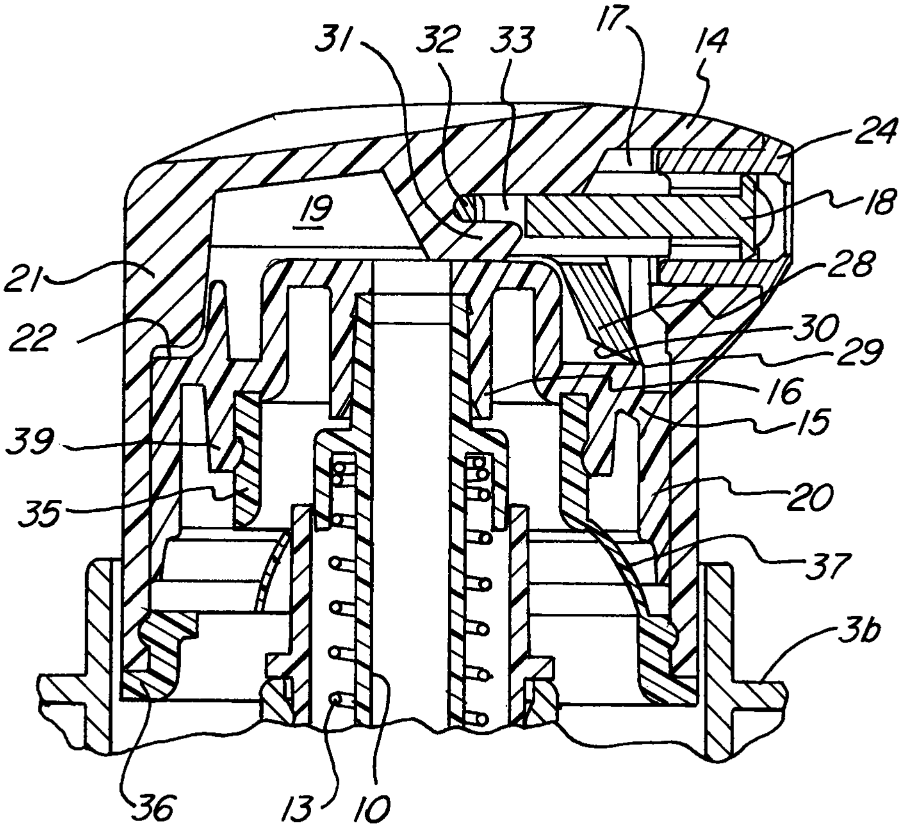

In the description, the terms of positioning in the space are taken in reference to the position of the pump shown in FIGS. 1 to 3.

In relation to the figures, an embodiment of a dispensing system is described comprising a pump actuated by a push-button in order to allow for the dispensing of a product under pressure, for example in the form of a small amount or a continuous stream.

To do this, the dispensing system is mounted on a bottle containing the product to be dispensed under pressure. In an example application, the product is a gel or a cream, for cosmetic use or for pharmaceutical treatments.

In the embodiment shown, the bottle comprises a body 1 surmounted by a ring 2 and the dispensing system comprises a hoop 3 whereon the pump is mounted, said hoop being associated to the ring 2 in such a way as to place the pump in sealed communication with the product.

The hoop 3 shown is carried out in two portions associated together: a lower portion 3*a* for maintaining the pump which has a central duct 4 wherein the pump is mounted and an upper portion 3*b* covering said lower portion. More precisely, the central duct 4 is surrounded by an outer surface 5 which is associated in a sealed manner in the ring 2. The upper portion 3*b* has a sleeve 6 associated around the central duct 4 and an outer surface 7 mounted on the outer surface 5 of the lower portion 3*a*.

In the bottle shown, a feed piston 8 of the product is slidably mounted in the body 1 in such a way as to push the product in the pump with a view to its dispensing without air return. For this, the bottle comprises, opposite the pump, a vent hole 9. Although the description is provided in relation with a dispensing without air return, the pump according to the invention can be used with other types of dispensing, for example for products contained in flexible bottles.

The figures show a pump known in particular in FR-2 908 843 of which the content is incorporated by reference in this description, without the invention being restricted to a particular pump structure, in particular relative to the means required for the pressurisation of the product to be dispensed.

The pump comprises a feed tube 10 of the product under pressure of which the upstream portion is in communication with a metering chamber 11 provided with an inlet valve 12 of the product contained in the bottle. The feed tube 10 can be displaced over a dispensing/suction stroke of the product, said displacement being limited by a means of elastic recalling formed of a spring 13.

In order to actuate this displacement, the push-button is mounted on the downstream portion of the feed tube 10, said push-button comprising an actuator body 14 and a sleeve 15 having a mounting well 16 of said push-button on said feed tube. As such, by fixing the mounting well 16 on the feed tube 10, the dispensing of the product is carried out by pressing on the body 14 in order to actuate the displacement of said tube by the intermediary of the sleeve 15.

The actuator body 14 has an orifice 17 for ejecting the product, said orifice being provided with a closing off valving element 18 in order to allow for the reversible closing of said orifice between two uses. The embodiment described makes it possible in particular to provide a good seal in a simple manner while still limiting the pressure exerted on the product in order to open the orifice 17.

The body 14 is slidably mounted around the sleeve 15 between a high position (FIGS. 1*a*, 3*a*) and a low position (FIG. 1*b*, 3*b*) by forming between them a space 19 for carrying the product from the mounting well 16 to the orifice for ejecting the product 17. As such, the mounting of the dispensing system on the bottle allows for the carriage of the product from the bottle to the orifice for ejecting the product 17 by the intermediary of the feed tube 10 then the space 19.

In particular, the space for carrying 19 is formed substantially under the upper portion of the body 14 by being delimited by the upper face of the sleeve 15, the closing off valving element 18 being arranged in said space.

The sleeve 15 shown comprises an outer surface 20 on the exterior of which the skirt of the body 14 is slidably mounted, said surface surrounding the mounting well 16. According to an embodiment, the sliding can be sealed in order to confine the space for carrying 19 to this level.

Moreover, the end of travel of the sliding of the body 14 on the sleeve 15 is defined by the putting into bearing of a wall 21 of the body 14 in a groove 22 formed in the sleeve 15. As such, the actuating effort of the pump is transmitted on this bearing which can be adapted for this purpose.

The valving element 18 is mounted between the body 14 and the sleeve 15 by the intermediary of a device for reversible displacing of said valving element between a closing off position—respectively an ejection position—when the body 14 is in high position—respectively low position—.

Figure 7:
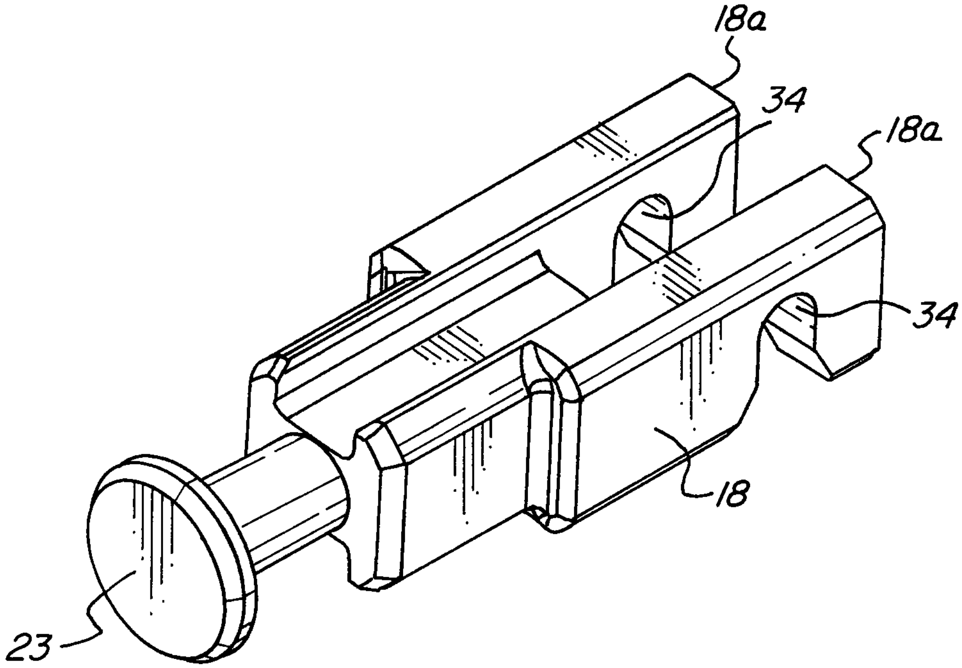
FIG. 7 is a perspective view of the closing off valving element of the push-button according to FIG. 3.

In relation with FIG. 7, the valving element 18 comprises an arm of which the front end is provided with a closing off head 23, the rear end of said arm being associated to the sleeve 15 by the intermediary of the device for reversible displacing.

Figure 5:
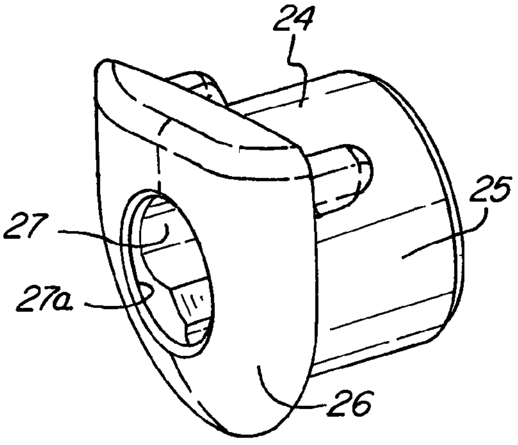
FIG. 5 is a perspective view of the nozzle of the push-button according to FIG. 3.

Furthermore, the orifice for ejecting the product 17 is provided with a nozzle 24 wherein the closing off head 23 is mounted between its closing off and ejection positions. In relation with FIG. 5, the nozzle 24 comprises a press fitting portion 25 in the orifice for ejecting the product 17, said portion being extended by a front portion 26. The portions 25, 26 have a bore 27 wherein the head 23 is slidably mounted, the front end 27*a* of said bore forming a sealed seat for the head 23 in closing off position.

Figure 6:
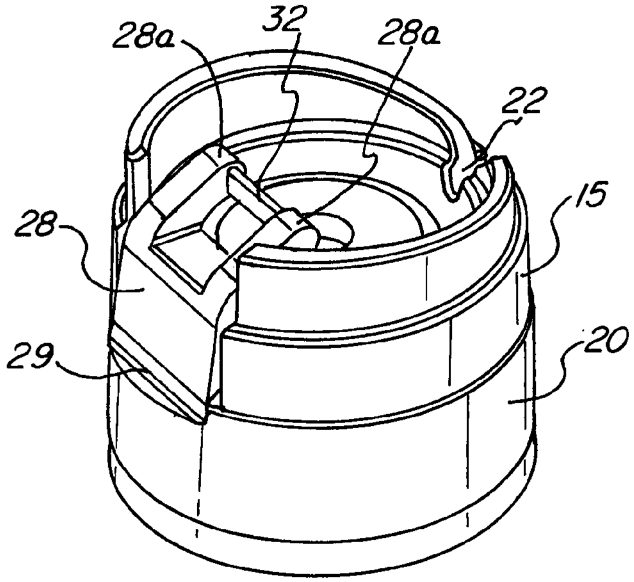
FIG. 6 is a perspective view of the sleeve of the push-button according to FIG. 3.

In relation with FIG. 6, the device for reversible displacing of the valving element 18 comprises a tab 28 incorporated on the sleeve 15 by the intermediary of a hinge 29, the valving element 18 being integral with the tab 28. In particular, the sleeve 15 can be carried out by moulding by forming a thinned zone forming the hinge 29 at the base of the tab 28, said zone also having a cut-out 30 in order to allow for the rotation of said tab around said hinge.

Figure 4:
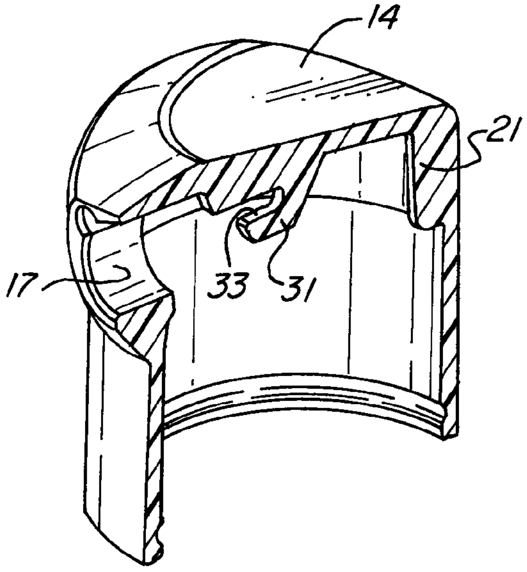
FIG. 4 is a sectioned perspective view of the body of the push-button according to FIG. 3.

In relation with FIG. 4, the device for reversible displacing further comprises a hook 31 integral with the body 14 in order to actuate the displacement of the tab 28 around the hinge 29 during the sliding of said body. In particular, in the embodiment shown, the hook 31 is incorporated under the body 14, in the space for carrying 19.

In the embodiment shown, the tab 28 comprises an axis 32 mounted mobile in a slider 33 of the hook 31, the valving element 18 comprising bridges 34 for attaching on said axis. This embodiment makes it possible to transform the axial sliding of the body 14 into a substantially radial translation of the valving element 18 between its closing off and ejection positions.

The valving element 18 comprises two rear flanks **18*a* on each one of which a bridge 34 is formed, the hook 31 being arranged in median position in order to be inserted between said bridges during their mounting on the axis 32. Furthermore, the tab 28 is inclined so that an axial bearing on the axis 32 by the intermediary of the hook 31 induces a pulling back of said tab and therefore a sliding of said axis in the slider 33. More precisely, the tab 28 has two arms 28*a* inclined towards the interior between which the axis 32** is formed.

The push-button further comprises at least one means of elastic recalling of the body 14 in high position in such a way that, in the absence of pressing on said body, the latter is in high position of closing of the orifice for ejecting the product 17. This embodiment, by incorporating the means of elastic recalling in the push-button, makes it possible to limit the number of components to be assembled while facilitating the assembly of the dispensing system. Furthermore, the reproducibility of the performance relative to the closing function of the orifice for ejecting the product 17 is also improved.

According to an embodiment, the effort exerted by the means of elastic recalling 13 of the feed tube 10 can be greater than the effort exerted by the means of elastic recalling of the body 14. As such, a pressing on the body 14 first induces a displacement of said body in relation to sleeve 15 in order to open the orifice for ejecting the product 17 then a displacement of the sleeve 15 and therefore of the feed tube 10 in order to pressurise the product to be dispensed.

According to an embodiment, the push-button comprises a ring 35 integral with the sleeve 15 and a ring 36 integral with the body 14, said rings being connected together by the intermediary of a means of elastic recalling of said body in high position.

In particular, the means of elastic recalling can include at least one connecting lug 37 of the rings 35, 36, said lug being deformed between a stable condition and a stressed condition during the sliding of the body 14 in relation to sleeve 15.

Figure 8:
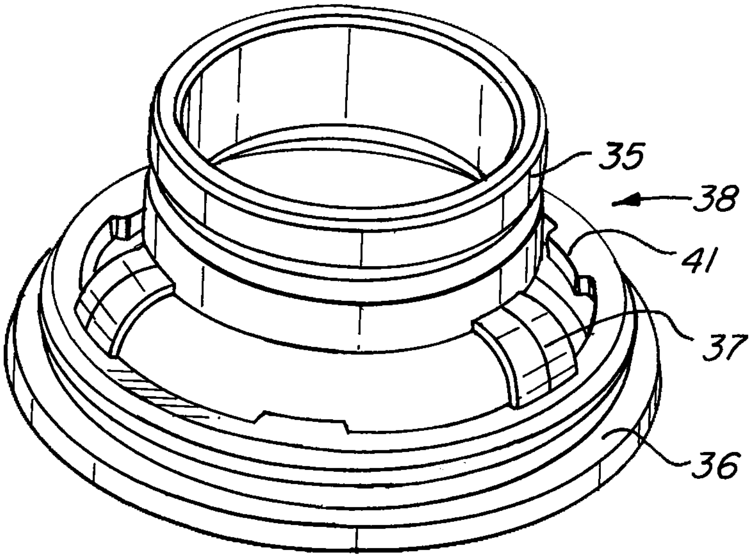
FIG. 8 is a perspective view of the member of elastic recalling of the body of the push-button according to FIG. 3.

FIG. 8 shows the integration of the rings 35, 36 and of lugs 37 for elastic recalling in a member 38, said rings being fixed respectively to the sleeve 15 and to the body 14. To do this, the sleeve 15 comprises an inner surface 39 whereon the ring 35 is fixed and the other ring 36 is fixed around the extreme lower portion of the body 14. However, at least one ring 35, 36 could be incorporated respectively into the sleeve 15 or into the body 14.

In this figure, three lugs 37 are equally distributed between the rings 35, 36 having a stable condition curved in order to allow for their stretching in stressed condition, said lugs being made from a shape memory material in order to exert the desired elastic recalling effort. In examples of embodiments, the member 38 for elastic recall can be carried out by moulding of an elastomeric polymer such as Poly(OxyMethylene) or polypropylene of the Adflex type.

Alternatively, a continuous elastic membrane can be arranged between the rings 35, 36 in order to form the means of elastic recalling, this embodiment having the advantage of also forming a seal for the space for carrying 19 when the rings 35, 36 are fixed in a sealed manner respectively to the sleeve 15 and to the body 14.

FIG. 2 shows an alternative embodiment wherein the dispensing system comprises a second means of elastic recalling 40 of the body 14 in high position which, contrary to the first means 37, is not incorporated into the push-button. This embodiment is particularly advantageous in order to be able to supplement the recalling effort conferred by the lugs 37, in particular when the viscosity of the product is substantial and/or when the responsiveness alone of said lugs is not sufficient in order to render reliable the return to high position of the body 14.

In this figure, the second means is formed of a spring 40 which is with a lower bearing on the hoop 3 and with an upper bearing on the ring 36 integral with the body 14. For this, the ring 36 has internal protrusions 41 for causing the bearing of said spring on it, said protrusions being inserted between the lugs 37.

What is claimed is:

1. A push-button for a system for dispensing a product under pressure, said push-button comprising an actuator body having an ejecting orifice for ejecting said product, a closing off valving element of said ejection orifice and a sleeve having a mounting portion configured to mount on a feed tube for said product under pressure, wherein said body is slidably mounted around said sleeve between a high position and a low position by forming between them a space for carrying said product from said mounting portion to said orifice for ejecting said product, said valving element being mounted between said body and said sleeve by a device for reversible displacing of said valving element between a closing off position when said body is in the high position and an ejection position when said body is in the low position, said push-button further comprising at least one member for elastic recalling of said body to the high position, the push-button further comprising a ring integrally attached to said sleeve and a ring integrally attached to said body, said rings being connected together by said member for elastic recalling of said body to the high position, wherein said valving element comprises an arm of which a front end is provided with a closing off head, a rear end of said arm being associated to said sleeve by said device for reversible displacing.

2. The push-button according to claim 1, wherein said member for elastic recalling comprises at least one connecting lug of said rings, said lug being deformed between a stable condition when said body is in the high position and a stressed condition when said body is in the low position during said sliding of said body in relation to said sleeve.

3. The push-button according to claim 2, wherein said lug is made from a shape memory material.

4. The push-button according to claim 1, wherein said rings and said member for elastic recalling are incorporated together, said rings being fixed respectively to said sleeve and to said body.

5. The push-button according to claim 1, wherein said orifice for ejecting said product is provided with a nozzle wherein said end of said valving element is mounted between its closing off and ejection positions.

6. A dispensing system for a product under pressure comprising a pump actuated by a push-button according to claim 1, said pump comprising the feed tube for said product under pressure whereon said mounting portion is fixed.

7. The dispensing system according to claim 6, further comprising of a second member for elastic recalling of said body in the high position.

8. The dispensing system according to claim 6, further comprising of a hoop whereon said pump is mounted.

9. A bottle containing a product to be dispensed under pressure, said bottle comprising a ring whereon a hoop of a dispensing system according to claim 8 is associated in such a way as to place said pump in communication with said product in order to allow for carriage of said product from said feed tube to said orifice for ejecting said product.

10. A push-button for a system for dispensing a product under pressure, said push-button comprising an actuator body having an ejecting orifice for ejecting said product, a closing off valving element of said ejection orifice and a sleeve having a mounting portion configured to mount on a feed tube for said product under pressure, wherein said body is slidably mounted around said sleeve between a high position and a low position by forming between them a space for carrying said product from said mounting portion to said orifice for ejecting said product, said valving element being mounted between said body and said sleeve by a device for reversible displacing of said valving element between a closing off position when said body is in the high position and an ejection position when said body is in the low position, said push-button further comprising at least one member for elastic recalling of said body to the high position, the push-button further comprising a ring integrally attached to said sleeve and a ring integrally attached to said body, said rings being connected together by said member for elastic recalling of said body to the high position, wherein said device for reversible displacing of said valving element comprises a tab mounted on said sleeve by a hinge, said valving element being integral with said tab, said device further comprising a hook integral with said body in order to actuate the displacement of said tab around said hinge during said sliding of said body.

11. The push-button according to claim 10, wherein said tab comprises an axis mounted mobile in a slider of said hook, said valving element (comprising at least one bridge for fastening on said axis.

12. A dispensing system for a product under pressure comprising a pump actuated by a push-button, said push-button comprising an actuator body having an ejecting orifice for ejecting said product, a closing off valving element of said ejection orifice and a sleeve having a mounting portion configured to mount on a feed tube for said product under pressure, wherein said body is slidably mounted around said sleeve between a high position and a low position by forming between them a space for carrying said product from said mounting portion to said orifice for ejecting said product, said valving element being mounted between said body and said sleeve by a device for reversible displacing said valving element between a closing off position when said body is in the high position and an ejection position when said body is in the low position, said push-button further comprising at least one member for elastic recalling of said body to the high position, the push-button further comprising a ring integrally attached to said sleeve and a ring integrally attached to said body, said rings being connected together by said member for elastic recalling of said body to the high position, said pump comprising the feed tube for said product under pressure whereon said mounting portion is fixed, wherein said feed tube is displaced by said sleeve over a dispensing/suction stroke of said product, said displacement being limited by a second member for elastic recalling.

13. The dispensing system according to claim 12, wherein effort exerted by said second member for elastic recalling of said feed tube is greater than effort exerted by said member for elastic recalling of said body.

* * * * *